April 30, 1940.  B. F. QUINTANA  2,199,186
INDIVIDUAL DRIVEN FERRY
Filed Dec. 17, 1938  2 Sheets-Sheet 1
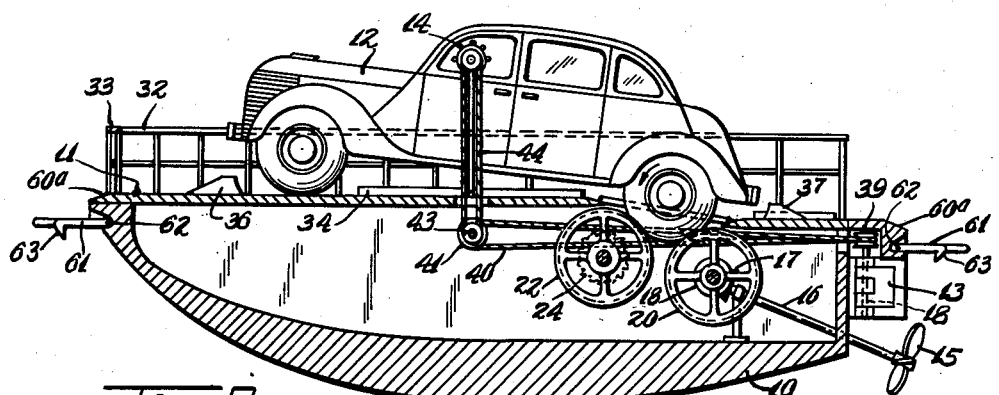
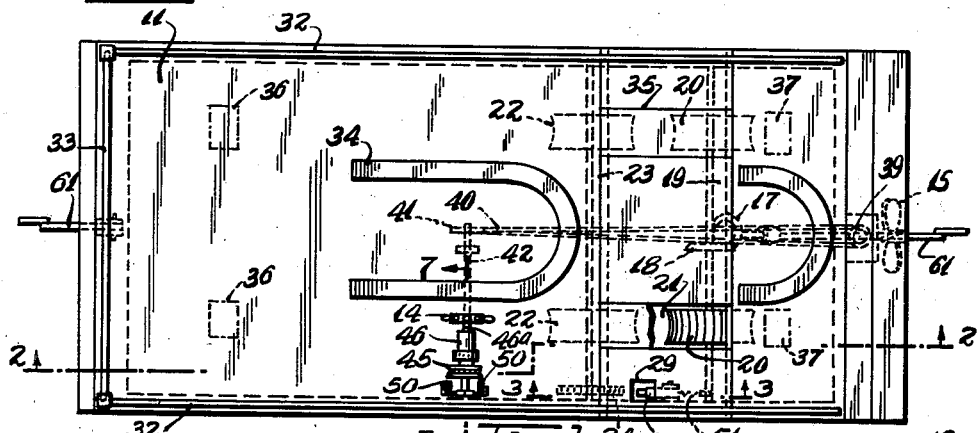
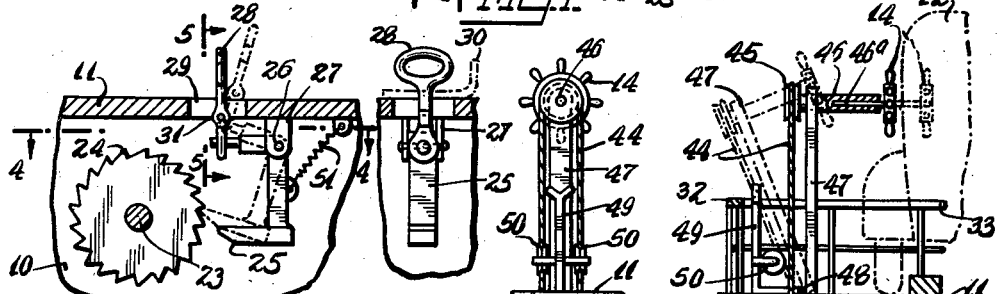
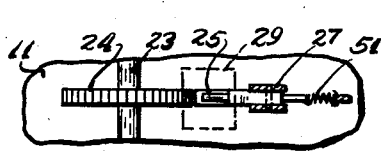
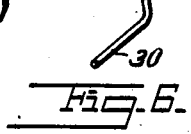
INVENTOR
*Benigno F. Quintana*
BY
ATTORNEY April 30, 1940.  B. F. QUINTANA  2,199,186
INDIVIDUAL DRIVEN FERRY
Filed Dec. 17, 1938   2 Sheets-Sheet 2
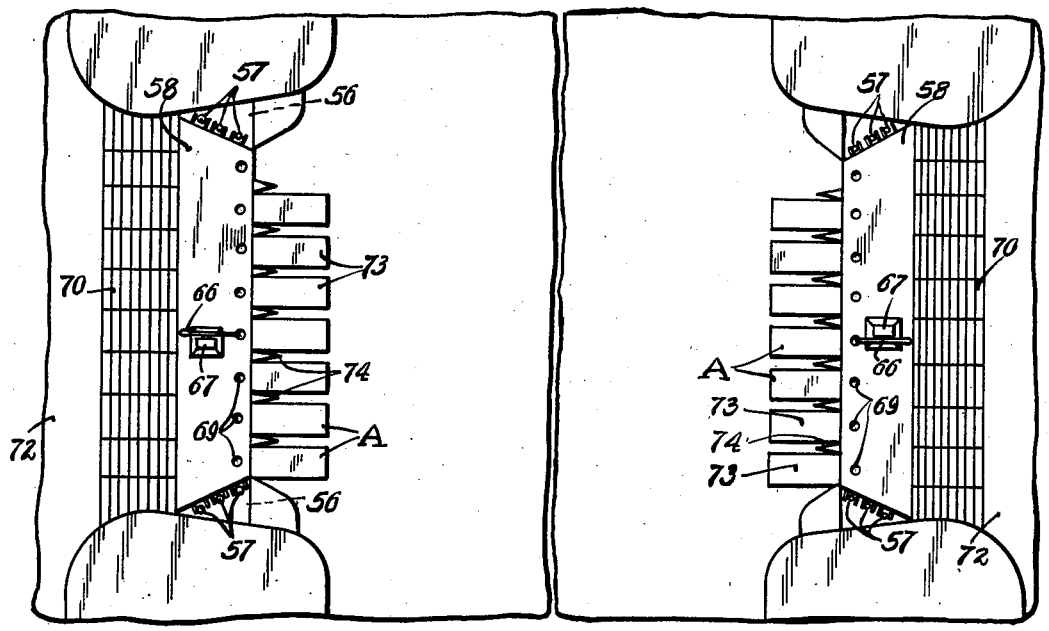
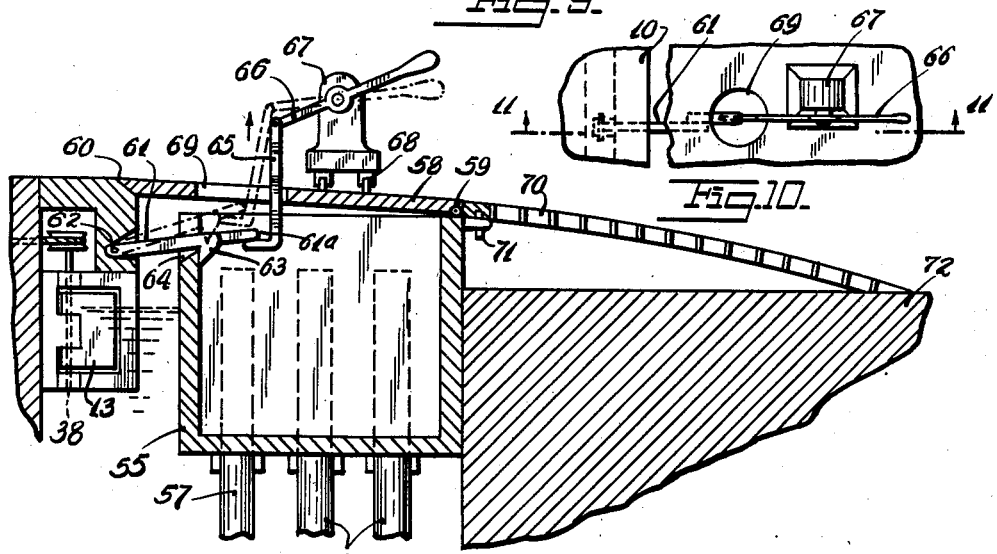
INVENTOR
Benigno F. Quintana
BY
ATTORNEY Patented Apr. 30, 1940

2,199,186

UNITED STATES PATENT OFFICE 2,199,186

INDIVIDUAL DRIVEN FERRY

Benigno F. Quintana, New York, N. Y.

Application December 17, 1938, Serial No. 246,363

3 Claims. (Cl. 114—231)

This invention relates to new and useful improvements in an individual driven ferry.

The invention has for an object the construction of a ferry as mentioned which is characterized by a float having a top flat surface upon which an automobile may rest, and a novel mechanism by which the power generated by the automobile may be used for driving the ferry.

Furthermore, the invention contemplates a novel arrangement for securely holding the automobile in position on the ferry during the time it is used to actuate the same.

Still further a novel arrangement for steering the ferry is proposed operable by a control adapted to extend through one of the windows of the automobile to the vicinity of the driver's seat thereof.

Another object of this invention resides in a novel arrangement for assisting the automobile in driving off the ferry after it has reached its destination.

Still further the invention proposes a novel arrangement for anchoring the ferry at its destination.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a plan view of an individual driven ferry constructed according to this invention.

Fig. 2 is a vertical sectional view on the line 2—2 of Fig. 1.

Fig. 3 is a fragmentary enlarged sectional view on the line 3—3 of Fig. 1.

Fig. 4 is a horizontal sectional view taken on the line 4—4 of Fig. 3.

Fig. 5 is a fragmentary vertical sectional view taken on the line 5—5 of Fig. 4.

Fig. 6 is a perspective view of a bolt used in the device.

Fig. 7 is a fragmentary transverse vertical sectional view on the line 7—7 of Fig. 2.

Fig. 8 is an end elevational view of Fig. 7 looking from the left hand side.

Fig. 9 is a plan view of the piers for the ferry.

Fig. 10 is a fragmentary enlarged plan view of a portion of Fig. 9.

Fig. 11 is a fragmentary vertical sectional view taken on the line 11—11 of Fig. 10.

The individual automobile driven ferry, according to this invention, includes a boat shaped float 10 having a flat surface 11 upon which an automobile 12 may rest. At the rear of the float there is a rudder 13 by which the same may be steered. This rudder is connected with a steering means operable from the driver's seat of the automobile 10 and including a control wheel 14. At the rear the float 10 is provided with a driver propeller 15 mounted on the shaft 16 extending into the float. This shaft is provided with a bevel gear 17 meshing with a gear 18 on a shaft 19 rotatively mounted transversely of the float 10. Traction wheels 20 are mounted on the shaft 19 and these wheels are accessible through openings 21 formed in the top of the float. In line with these wheels, but to the front, there are idler wheels 22 which are rotatively mounted on a shaft 27 transversely of the float.

The wheels 20 and 22 are slightly spaced longitudinally from each other and are arranged at a position so that the rear wheels of the automobile 12 may simultaneously rest on these wheels. The arrangement is such that when the rear wheels of the automobile are driven, the wheels 22 will merely idle and the wheels 20 will be rotated to transmit rotations to the propeller 15.

A means is provided for holding the idler wheels 22 when required to assist the automobile in driving off the float. This holding means includes a ratchet wheel 24 mounted on the shaft 23 and cooperative with a pawl 25. This pawl is in the shape of a bell crank which is pivotally supported intermediate of its ends by a pin 26 mounted on a bracket 27. This bracket is supported on the underside of the top wall of the float. The lower end of the pawl 25 is adapted to engage the teeth of the ratchet wheel to hold the same stationary.

The upper end of the pawl is provided with a handle 28 by which the pawl may be operated. This handle extends through an opening 29 in the top wall of the float. When the handle 28 is lifted the pawl is engaged with the ratchet wheel. The handle 28 may be held in its lifted position by a bolt 30. This bolt is adapted to engage through a keeper opening 31 formed in the handle 28. When the handle 28 is in the raised position and the bolt 30 engaged through the opening 31 thereof, the bolt will extend across the opening 29, as indicated by the dot and dash lines in Fig. 1, and this will serve to hold the pawl 25 in its operative position holding the ratchet wheel. When the pawl is fixedly held the automobile 12 may be driven forward since the rear wheels may now climb up on and over the wheels 22.

Along the sides of the float 10 there are railings 32. Across the front of these railings there is a removable gate 33. When this gate is removed the automobile may drive off the front of the float. A U-shaped guide 34 is mounted on the top of the float and is adapted to correctly guide the positioning of the automobile 12 so that its rear wheels will be properly rested on the wheels 20 and 22. With each ferry a pair of planks 35 is provided which are adapted to be placed over the openings 21 by an attendant to permit the front wheels of the automobile to pass over the opening 20. After the front wheels have passed over, and before the rear wheels have reached their proper positions, the planks 35 are removed. Then the automobile may be driven slightly forwards to its correct position. Each ferry is provided with blocks 36 and 37 adapted to be placed by an attendant to the front and to the rear of the wheels of the automobile to assist in preventing the accidental rolling of the automobile from the ferry.

The rudder 13 is fixed on a shaft 38 the upper end of which is provided with a pulley 39. A cable 40 engages over this pulley 39 and extends frontwards of the float and engages over a pulley 41 mounted on the shaft 42 rotatively supported transversely of the float beneath the top wall thereof. The shaft 42 is provided with another pulley 43 over which an endless cable 44 passes. This cable extends upwards and over a pulley 45 mounted on a shaft 46. The hand wheel 14 is mounted on this shaft 46. The shaft 46 is rotatively supported in a standard 47 which is mounted on the top wall of the float by a hinge 48. In line with the hinging of the standard 47 there is a bracket 49 which supports a pair of pulleys 50. These pulleys are in direct line with the side portions of the cable 44. The arrangement is such that when the bracket 47 is pivoted laterally, as indicated by the dot and dash lines in Fig. 7, then the cables 44 engage the pulleys 50 which act as idlers to support the cable.

The shaft 46 has an extension portion 46ª telescopically arranged to permit the wheel 14 to be horizontally extended through the side window of the automobile. The laterally tilted position of the bracket 47 represents the inoperative position of the steering mechanism. In this position there is no obstruction for the automobile to be driven upon and off the ferry. To use the steering mechanism it is required that the wheel 14 be projected through the window of the automobile.

A spring 51 acts between the pawl 25 and the top wall of the ferry 10 for normally urging the pawl 25 into its inoperative position. When the bolt 30 is removed from the handle 28 the spring 51 will move the parts to the position shown by the full lines in Fig. 3.

At the shores of the river across which the ferry operates there are dock floats cooperative with the ferry for properly docking the ferry. Each dock float includes a hollow float 55 which is provided with flanges 56 at its ends through which vertical piles 57 extend. These piles 57 hold the float from moving away but permit it to rise and fall with the tide. On top of each float 55 there is a plank 58 which is hingedly connected by a hinge 59 to the shore side of the float. The water side of this plank is provided with a bevel 60 adapted to rest upon a complementary receiving bevel 60ª upon the ends of the float. Each float is provided with a latch lever 61 at its front and rear ends. These latch levers are pivotally supported by pins 62. Intermediate of their outer ends they have hook portions 63 engageable with complementary hooking portions 64 formed on the water side of the float 55.

Each latch lever 61 has a projecting end 61ª adapted to be engaged by a hook 65 to release the latch when required. An attendant operates the hook 65. The hook 65 is mounted on a lever 66 pivotally mounted on a truck 67. This truck is provided with wheels 68 and is adapted to be carted along the dock. The plank 58 is provided with a plurality of holes 69 through which the hook 65 may be engaged to coact with the end 61ª of the latch lever. A plank 70 in the form of a grate member has one of its ends provided with hooks 71 hooked on to the land side of the float 55. The other end of the plank 70 rests on the ground 72.

The operation of the device is as follows:

There must be an attendant at each dock. Each dock is provided with a plurality of stalls 73 separated by baffle plates 74. Each stall is intended for one ferry. The rectangles A in Fig. 9 schematically represent the ferries in position along the dock. When an automobile approaches one of the docks the attendant permits the automobile to drive upon one of the ferries. The attendant assists the driver in properly placing the car on the ferry. When everything is in readiness the attendant releases the float with the car by moving the truck 67 adjacent the proper opening 69 and then pulling upon the hook 65 to disengage the latch holding the particular ferry. The ferry is now free to be propelled across the river by the motive power of the automobile as previously explained.

When it reaches the other side the ferry enters a vacant stall. By so doing the latch to the front of the ferry will automatically hook on to the dock in a manner similar to that illustrated in Fig. 11. The attendant at this side of the river now assists the car off the ferry. Then the attendant must release the ferry and turn it around and reengage it in its stall whereupon it is ready to receive another automobile for recrossing the river.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In a device of the class described, a dock float for docking a ferry having an automobile thereon, comprising a hollow float positioned at the shore, flanges formed on the ends of said hollow float, piles slidably extended between said flanges for permitting said float to rise and fall with the tide but preventing said float from moving away from the shore, a pivotally mounted latch lever mounted on said ferry and engageable with a complementary latching member on said float for connecting said ferry thereto, a member pivotally mounted on said float and extendable between the shore and said ferry while connected to said float for permitting said automobile to be driven from said float to the shore, and means for disconnecting said latch lever from said complementary latching member to free said ferry of said float when so desired.

2. In a device of the class described, a dock float for docking a ferry having an automobile thereon, comprising a hollow float positioned at the shore, flanges formed on the ends of said hollow float, piles slidably extended between said flanges for permitting said float to rise and fall with the tide but preventing said float from moving away from the shore, a pivotally mounted latch lever mounted on said ferry and engageable with a complementary latching member on said float for connecting said ferry thereto, a member pivotally mounted on said float and extendable between the shore and said ferry while connected to said float for permitting said automobile to be driven from said float to the shore, and means for disconnecting said latch lever from said complementary latching member to free said ferry of said float when so desired, comprising a projection formed on said latch lever and extending into the hollow of said float, a truck movable along said float, a lever pivotally mounted on said truck, a hook having one of its ends pivotally mounted on one end of said lever and the other of its ends engageable with said projection so that when the free end of said lever is moved downwards said hook will move upwards to correspondingly move said latch lever and free it of said complementary latching member.

3. In a device of the class described, a dock float for docking a ferry having an automobile thereon, comprising a hollow float positioned at the shore, flanges formed on the ends of said hollow float, piles slidably extended between said flanges for permitting said float to rise and fall with the tide but preventing said float from moving away from the shore, a pivotally mounted latch lever mounted on said ferry and engageable with a complementary latching member on said float for connecting said ferry thereto, a member pivotally mounted on said float and extendable between the shore and said ferry while connected to said float for permitting said automobile to be driven from said float to the shore, and means for disconnecting said latch lever from said complementary latching member to free said ferry of said float when so desired, comprising a projection formed on said latch lever and extending into the hollow of said float, a truck movable along said float, a lever pivotally mounted on said truck, a hook having one of its ends pivotally mounted on one end of said lever and the other of its ends engageable with said projection so that when the free end of said lever is moved downwards said hook will move upwards to correspondingly move said latch lever and free it of said complementary latching member, said pivotally mounted member being provided with an opening superimposed above said projection and through which the free end of said lever is adapted to be passed to engage said projection.

BENIGNO F. QUINTANA.